United States Patent [19]

Yoshida et al.

[11] Patent Number: 4,516,304
[45] Date of Patent: May 14, 1985

[54] METHOD AND APPARATUS FOR APPLYING REINFORCING PIECES TO SLIDE FASTENER CHAIN

[75] Inventors: Hiroshi Yoshida; Shunji Akashi, both of Kurobe; Kazuki Kuse, Toyama, all of Japan

[73] Assignee: Yoshida Kogyo K. K., Tokyo, Japan

[21] Appl. No.: 489,124

[22] Filed: Apr. 27, 1983

[30] Foreign Application Priority Data

Apr. 28, 1982 [JP] Japan .................................. 57-71761

[51] Int. Cl.$^3$ .............................................. B23P 21/00
[52] U.S. Cl. ...................................... 29/408; 29/33.2; 29/766
[58] Field of Search ................. 29/408, 766, 767, 407, 29/33.2, 34 A; 83/921

[56] References Cited

U.S. PATENT DOCUMENTS

| | | | |
|---|---|---|---|
| 3,488,239 | 1/1970 | Heimberger | 29/408 X |
| 3,800,394 | 4/1974 | Ruhrmann | 29/408 |
| 3,818,575 | 6/1974 | Johnston et al. | 29/408 |
| 4,074,413 | 2/1973 | Taccani | 29/767 X |
| 4,110,890 | 9/1978 | Akashi | 29/408 |
| 4,190,944 | 3/1980 | Yosheida et al. | 29/408 |
| 4,190,945 | 3/1980 | Yosheida et al. | 29/408 |
| 4,265,014 | 5/1981 | Yosheida et al. | 29/766 |
| 4,299,027 | 11/1981 | Yosheda et al. | 29/766 |
| 4,309,233 | 1/1982 | Akashi | 29/408 X |
| 4,381,593 | 5/1983 | Yoshieda et al. | 29/408 |

Primary Examiner—William R. Briggs
Assistant Examiner—Glenn L. Webb
Attorney, Agent, or Firm—Hill, Van Santen, Steadman & Simpson

[57] ABSTRACT

In a reinforcing-film applying apparatus for use in production of separable slide fasteners, there are a first working station where a shaping die and a coacting ultrasonic horn are located, and a second working station where a heating die and a coacting heating punch are located, the first and second working stations being spaced apart remotely from one another along a longitudinal path of a slide fastener chain. When one of successive pairs of blank tape portions arrives at the first working station, a reinforcing film piece is placed on the fastener chain across the pair of blank tape portions, whereupon the shaping die and the ultrasonic horn are moved toward one another to fuse the reinforcing film piece to the pair of blank tape portions only at their inner marginal areas and also to shape such fused marginal portions so as to provide therealong a pair of pin-like members to which a pin and a box of a separable bottom end stop are to be attached. After that, when the pair of blank tape portions with the reinforcing film piece partially fused thereto arrives at the second station as the fastener chain is further moved along the path, the heating die and punch are moved toward one another to apply pressure and heat to the pair of blank tape portions and the reinforcing film piece thereon at their superposed areas except at the pin-like members.

5 Claims, 6 Drawing Figures

FIG. 2

FIG. 2A

METHOD AND APPARATUS FOR APPLYING REINFORCING PIECES TO SLIDE FASTENER CHAIN

BACKGROUND OF THE INVENTION

1. Field of the Invention

The present invention relates to the production of separable slide fasteners, and more particularly to a method of and an apparatus for applying reinforcing film pieces of thermoplastic synthetic resin to a slide fastener chain at its longitudinally spaced element-free or blank tape portions.

2. Prior Art

U.S. Pat. No. 4,299,027, issued Nov. 10, 1981, discloses an apparatus for applying reinforcing film pieces of thermoplastic synthetic resin to a pair of unengaged slide fastener stringers at their longitudinally spaced element-free or blank tape portions. In the prior apparatus, a reinforcing film piece is fused completely to the blank tape portions of an adjacent pair by a shaping die and a coacting ultrasonic horn at a single station. The prior apparatus is not suitable for use in production of separable slide fasteners each having a separable bottom end stop; in that production, a pair of pin-like members to which a pin and a box of the separable bottom end stop are to be attached, must be formed on the blank tape portions of an adjacent pair along their inner edges, requiring a relatively high operating temperature of the ultrasonic horn. This high temperature impairs not only the reinforcing film piece but also the stringer tapes. With this arrangement a sufficient quality of slide fastener chain, for production of separable slide fasteners, cannot be obtained.

SUMMARY OF THE INVENTION

In a reinforcing-film applying apparatus according to the present invention, there are a first working station where a shaping die and a coacting ultrasonic horn are located, and a second working station where a heating die and a coacting heating punch are located, the first and second working stations being spaced apart remotely from one another along a longitudinal path of a slide fastener chain. When one of successive pairs of blank tape portions arrives at the first working station, a reinforcing film piece is placed on the fastener chain across the pair of blank tape portions, whereupon the shaping die and the ultrasonic horn are moved toward one another to fuse the reinforcing film piece to the pair of blank tape portions only at their inner marginal areas and also to shape such fused marginal portions so as to provide therealong a pair of pin-like members. After that, when the pair of blank tape portions with the reinforcing film piece partially fused thereto arrives at the second station as the fastener chain is further moved along the path, the heating die and punch are moved toward one another to apply pressure and heat to the pair of blank tape portions and the reinforcing film piece thereon at their superposed areas except at the pin-like members.

It is therefore an object of the invention is to provide a reinforcing-film applying method and apparatus by which an improved quality of slide fastener chain, suitable for production of separable slide fasteners, can be obtained.

Another object of the invention is to provide a reinforcing-film applying method in which the fusing and shaping time and termperature at a first working station can be controlled independently from the fusing time and temperature at a second working station, and vice versa, thus enabling accurate and easy application of reinforcing film pieces to a slide fastener chain for production of separable slide fasteners.

Still another object of the invention is to provide a reinforcing-film applying apparatus in which a shaping die and a coacting ultrasonic horn at the first working station can be constructed in precise agreement with their desired operating conditions, irrespective of the desired operating conditions of a heating die and a coacting heating punch at the second working station, and vice versa.

Many other advantages, features and additional objects of the present invention will become manifest to those versed in the art upon making reference to the detailed description and the accompanying drawings in which a preferred embodiment incorporating the principles of the present invention is shown by way of illustrative example.

DETAILED DESCRIPTION

Figure 1:
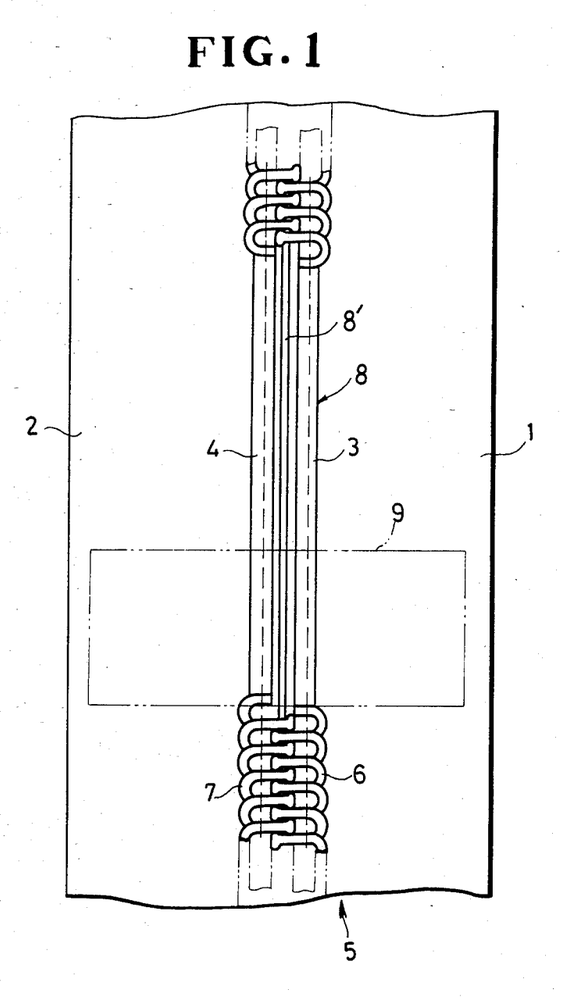
FIG. 1 is a fragmentary plan view of a slide fastener chain, showing an element-free portion before a pair of reinforcing film pieces is applied thereto (one on each suface of the fastener chain) according to the present invention.

FIG. 1 shows a slide fastener chain 5 to which reinforcing film pieces 9 of thermoplastic synthetic resin are to be applied, by the apparatus (FIGS. 3 and 4), for production of separable slide fasteners each having a separable bottom end stop (not shown). The fastener chain 5 comprises a pair of continuous stringers, each having successive spaced groups 6,7 of coupling elements mounted on a continuous stringer tape 1,2 along a core cord 3,4 extending along a longitudinal edge of the tape. The successive groups 6 of coupling elements on one stringer tape 1 are interengaged with opposite complementary groups 7 of coupling elements on the other stringer tape 2, there being successive spaced pairs of element-free or blank tape portions 8 between the successive spaced pairs of coupling element groups 6,7. The stringer tapes 1,2 and the core cords 3,4 are composed of thermoplastic synthetic fibers for a purpose described below.

Figure 3:
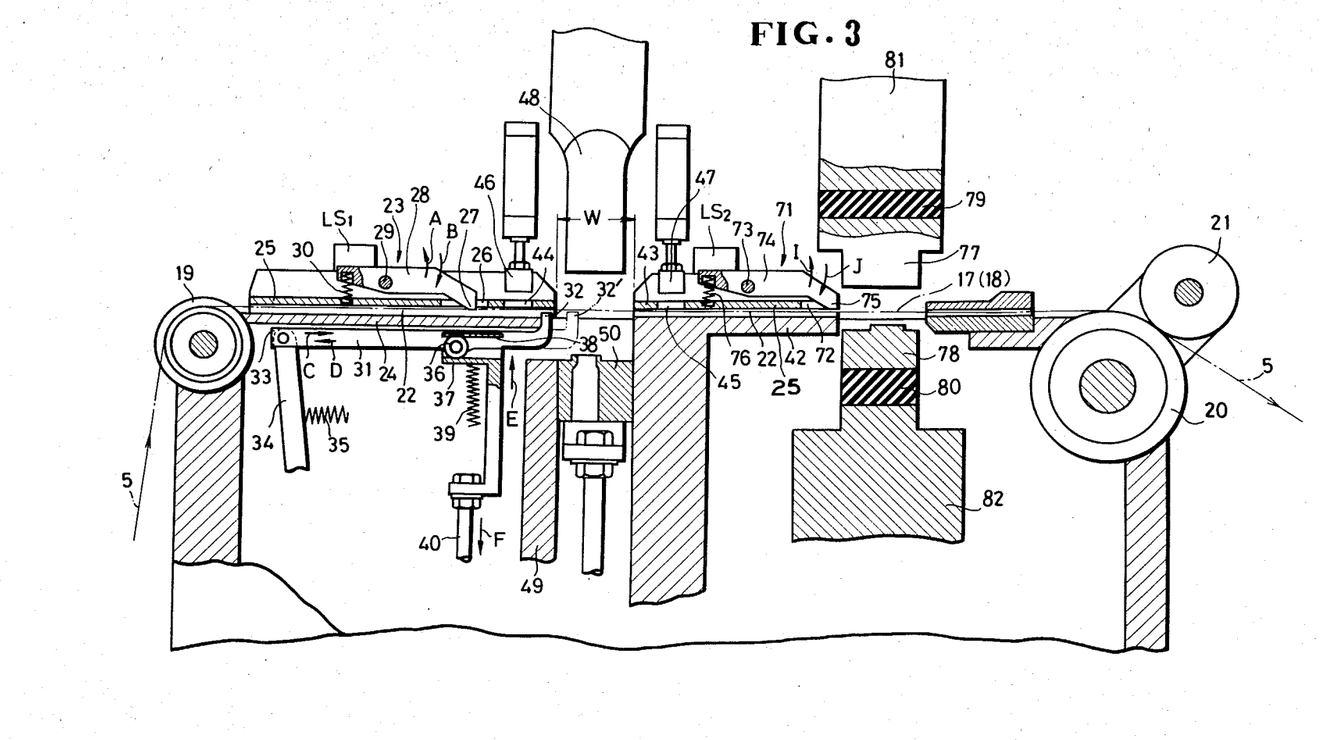
FIG. 3 is a vertical cross-sectional view of a reinforcing-film applying apparatus, showing the same along a path of the fastener chain.
Figures 4, 5:
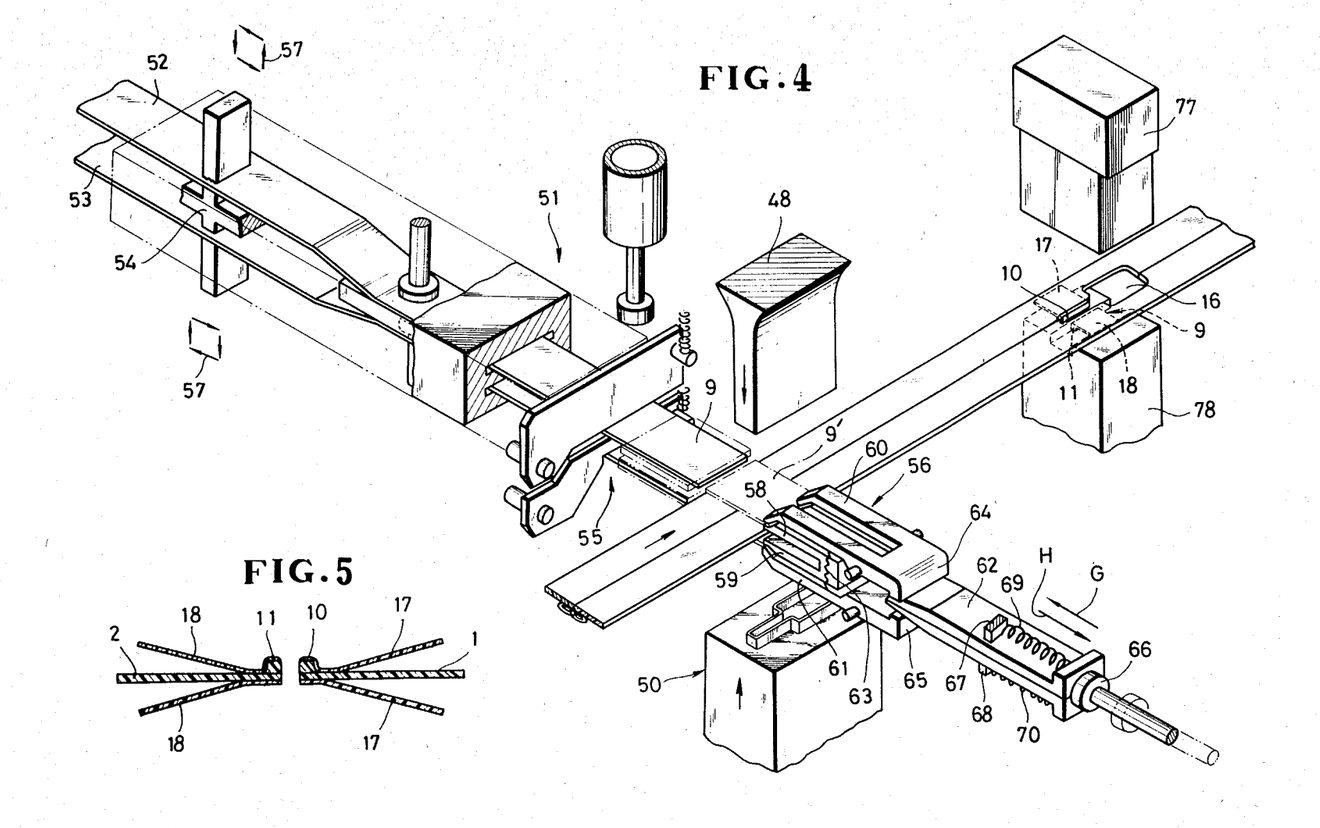
FIG. 4 is a fragmentary perspective view, with parts omitted, of the apparatus, showing the manner in which a pair of reinforcing film pieces is severed from a pair of continuous strips and is applied to the fastener chain.
FIG. 5 is a transverse cross-sectional view taken along line V—V of FIG. 2, showing the reinforcing film pieces having been partially fused to the element-free portion.

As shown in FIGS. 3 and 4, the apparatus comprises a frame having a guide table (including a first and a second guide plate 24,42) for supporting thereon the fastener chain 5 along a horizontal first path 22 (FIG. 3), a pair of feed rollers 20,21 (one of which rollers 20 is a driven roller) and a guide roller 19 disposed downstream and upstream, respectively, of the guide table 24,42 for moving or feeding the fastener chain 5 longitudinally along the first path 22 over the guide table 24,42 in a predetermined direction, rightwardly in FIG. 3, a first sensor 23 (described below) for detecting the approach of one of the successive spaced pairs of blank tape portions 8 to a first working station (described below), and a fastener-chain stop (described below) operatively connected with the first sensor for temporarily stopping the movement of the fastener chain 5 when the detected pair of blank tape portions 8 has arrived at the first working station.

The first sensor 23 (FIG. 3) includes a feeler lever 28 which is pivotally supported on the frame by a pin 29 and which is normally urged by a compression spring 30 to pivot in the direction of an arrow B; a tip end 27 of the feeler lever 28 thus normally projects centrally into the path 22 of the fastener chain 5 through an aperture 26 in an upper guide plate 25. When the tip end 27 of the feeler lever 28 comes into engagement with the opposed coupling element groups 6,7 of the fastener chain 5, the feeler lever 28 pivots in the direction of an arrow A against the bias of the spring 30. Upon arrival of one of the successive pairs of blank tape portions 8, the feeler lever 28 pivots, in the direction of the arrow B, to actuate by its other end a switch LS1 which produces a signal for initiating the operation of the fastener-chain stop, as described below.

The fastener-chain stop includes a horizontally extending member 31 disposed below the path 22 and having an upwardly angled tip end 32. At the other end 33 remote from the upwardly angled tip end 32, the stop member 31 is pivotally connected to a free end of a vertical lever 34 which is pivotally supported on the frame and which is normally urged leftwardly, i.e. in the direction of an arrow D, by means of a spring 35. A roller 36 is mounted on the stop member 31 and is carried by a pair of guides 37,38 on a vertical support 40 which is vertically movable between its raised position in which the tip end 32 of the stop member 31 is inserted into a space 8' (FIG. 1) between the opposed blank tape portions 8 of an adjacent pair, and its lowered position in which the tip end 32 of the stop member 31 is retracted out of the path 22. Thus the stop member 31 is horizontally movable, in response to the pivotal movement of the vertical lever 34, along the path 22 between a first position where the tip end 32 of the stop member 31 is inserted into the space 8' between the opposed blank tape portions 8 of an adjacent pair, and a second position where the movement of the fastener chain 5 is halted and the tip end 32 of the stop member 31 is retracted out of the path 22. The vertical support 40 is normally urged toward its raised position, i.e. in the direction of an arrow E, by means of a spring 39. Upon receipt of a signal from the switch LS1, the vertical support 40 is movable to its raised position under the biasing force of the spring 39 in a well known manner, whereupon the stop member 31, with its tip end 32 in engagement with the leading end of one of the successive pairs of coupling element groups 6,7, is moved in the direction of an arrow C to its advanced or second position in a well known manner. Then the vertical support 40 is lowered, i.e. in the direction of an arrow F, to its lowered position against the bias of the spring 39, and the vertical lever 34 pivots counterclockwise under the biasing force of the spring 35 to cause the stop member 31 to be moved, in the direction of the arrow D, to its original or first position, as is well known in the art.

The apparatus also comprises a feed unit 51 (FIG. 4) for feeding a pair of continuous reinforcing film strips 52,53 of thermoplastic synthetic resin longitudinally in uniform steps of a predetermined distance equal to the length of one reinforcing film piece 9, to the first working station along a substantially horizontal second path extending perpendicularly to the first path 22. The feed unit is disclosed and claimed in our copending application, Ser. No. 489,125, filed on even date herewith now U.S. Pat. No. 4,489,873, issued Dec. 25, 1984 and having the same priority and assignee, to which the reader is referred for greater detail, and which is incorporated herein by reference. The feed unit 51 includes a step-by-step-feed device 54 operatively connected with a drive mechanism (not shown) so that a central member of the device 54, disposed between the two reinforcing film strips 52,53, is movable back and forth along the second path, while a pair of upper and lower members of the device 54, disposed outwardly of the reinforcing film strips 52,53, respectively, is movable along a pair of rectangular paths 57,57, respectively. A pair of cutters 55 is disposed between the feed unit 51 and the first working station. The cutters 55 are operable in timed relation to the stepwise feeding operation of the feed unit 51 for severing a pair of reinforcing film pieces 9,9 from the respective continuous strips 52,53 each time when the latter have been fed by the predetermined distance.

A double gripper 56, normally disposed immediately downstream of the first working station, is movable in the direction indicated by arrows G,H along the second path across the first working station for gripping the respective leading ends of the severed reinforcing film pieces 9,9, and for placing the same on opposite surfaces of the fastener chain 5 across a pair of blank tape portions 8 then disposed at the first working station. The double gripper 56 comprises a pair of non-pivotable jaws 58,59, a pair of pivotable jaws 60,61, and an actuator cam 62. The upper and lower jaws 60,61 are pivotally movable with respect to the upper and lower non-pivotable jaws 58,59, respectively, between a closed position in which the upper jaws 58,60 are closed to grip one of the two severed reinforcing film pieces 9 and, likewise, the lower jaws 59,61 are closed to grip the other severed reinforcing film piece 9, and an open position in which both the upper and lower jaws 58,60;59,61 are open to release the two reinforcing film pieces 9,9. A compression spring 63 is mounted between the pivotable jaws 60,61 to normally urge their gripping or front ends away from each other (open position). When the actuator cam 62 is inserted, by the action of a piston 66, between the pivotable jaws 60,61 at their rear ends 64,65 remote from the first working station, the gripping or front ends of the pivotable jaws 60,61 are moved toward each other against the bias of the spring 63 (closed position). In FIG. 4, when the piston 66 is moved from its solid line position to its phantom line position, the actuator cam 62 is retracted from the rear ends 64,65 of the pivotable jaws 60,61 by means of a pair of compression springs 69,70, each mounted between a rear flange of the actuator cam 62 and a stationary member 67,68.

Figure 2:
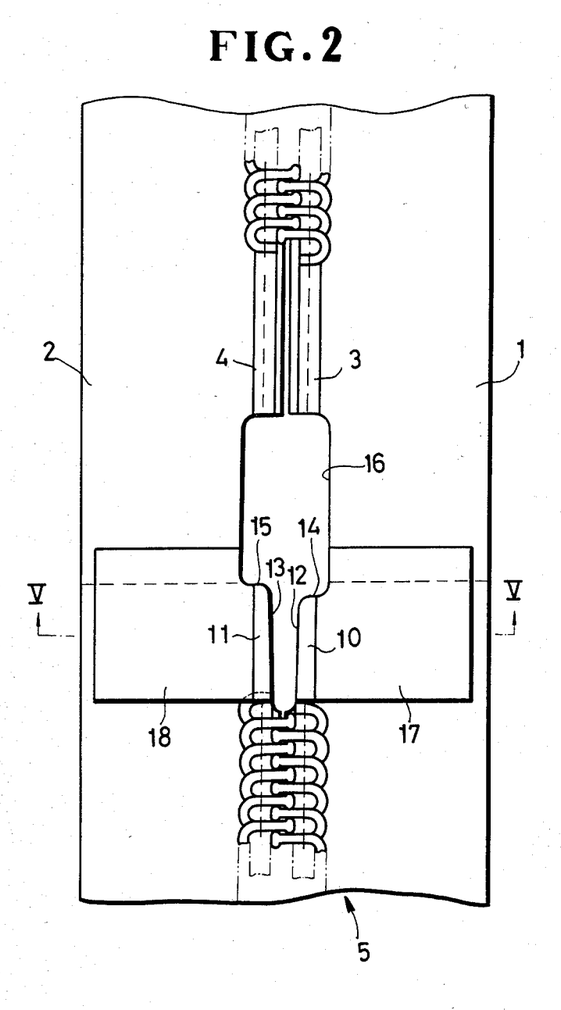
FIG. 2 is a view similar to FIG. 1, showing the element-free portion after the reinforcing film pieces have been applied thereto.

At the first working station, a shaping die 50 and a coacting ultrasonic horn 48 are vertically aligned with one another and are movable toward and away from one another in timed relation to the movement of the gripper 56. Upon placement of the severed reinforcing film pieces 9 on the fastener chain 5, the shaping die 50 and the ultrasonic horn 48 are movable toward one another for applying pressure and (ultrasonically generated) heat to a pair of blank tape portions 8 and the reinforcing film pieces 9 thereon to fuse the latter to the pair of blank tape portions 8 only at their inner marginal areas (including the core cords 3,4) and also to shape such fused marginal portions so as to provide, along the core cords 3,4, a pair of pin-like members 10,11 (FIGS. 2 and 5) to which a pin and a box of a separable bottom end stop (not shown) are to be attached.

At a second working station spaced remotely downstream from the first working station along the first path, a heating die 78 and a coacting heating punch 77 (FIGS. 3 and 4) are vertically aligned with one another, and they are movable toward one another for applying pressure and ultrasonically-generated heat to a pair of blank tape portions 8 and the reinforcing film pieces 9 thereon at their superposed areas except at the two pin-like members 10,11 when the pair of blank tape portions 8 with the reinforcing film pieces 9 partially fused thereto (FIG. 5) has arrived at the second working station as the fastener chain 5 is further moved. This arrival is detected by a second sensor 71 (FIG. 3) immediately upstream of the second working station. The second sensor 71 includes a feeler lever 74 which is pivotally supported on the frame by a pin 73 and which is normally urged by a compression spring 76 to pivot in the direction of an arrow J; a tip or one end 75 of the feeler lever 74 thus normally projects centrally into the path 22 of the fastener chain 5 through an aperture 72 in the upper guide plate 25. When the tip end 75 of the feeler lever 74 comes into engagement with the opposed coupling element groups 6,7 of the fastener chain 5, the feeler lever 74 pivots in the direction of an arrow I against the bias of the spring 76. Upon arrival of one of the successive pairs of blank tape portions 8, the feeler lever 74 pivots, in the direction of the arrow J, to actuate by its other end a switch LS2 which produces a signal for initiating the operation of the heating die 78 and punch 77. The heating punch 77 is secured via a thermal insulator 79 to an upper plunger 81, and the heating die 78 is likewise secured via a thermal insulator 80 to a lower plunger 82.

In operation, a slide fastener chain 5 (FIG. 1) is moved forwardly or rightwardly along the first path 22 through the apparatus (FIG. 4) via the guide roller 19 by the feed rollers 20,21. When one of the successive pairs of opposed blank tape portions 8 comes to the tip end 27 of the feeler lever 28, the latter is pivotally moved in the direction of the arrow B to actuate the switch LS1 for initiating the operation of the fastener-chain stop, as described below.

In response to actuation of the switch LS1, the vertical support 40 is moved to its raised position under the biasing force of the spring 39, raising the stop member 31. The upwardly angled tip end 32 of the stop member 31 is thus inserted into the space 8' (FIG. 1) between the opposed blank tape portions 8 of an adjacent pair. The leading end of a succeeding pair of coupling element groups 6,7 then comes into engagement with the tip end 32 of the stop member 31. With its tip end 32 in engagement with the leading end of the succeeding pair of coupling element groups 6,7, the stop member 31 is moved from a first position (solid lines in FIG. 3) to a second position (phantom lines in FIG. 3), causing the vertical lever 34 to be pivotally moved clockwise to de-energize the feed rollers 20,21. The movement of the fastener chain 5 is thus halted and, at the same time, the stop member 31 is lowered (in the direction of the arrow F) to retract the tip end 32 out of the first path 22. At that time, one of the successive pairs of blank tape portions 8 is in register with an aperture W of the guide table 24.

Then, a pair of pressure pads 46,47 is lowered, through a pair of apertures 44,45, respectively, of the upper guide plate 25, to the first path 22 to hold the fastener chain 5 in place against the guide table 24,42 for a purpose described below.

Meanwhile, a pair of continuous reinforcing film strips 52,53 (FIG. 4) is fed longitudinally, in uniform steps of a predetermined distance equal to the length of a single reinforcing film piece 9 to the first working station or the aperture W (FIG. 3) along the second path extending perpendicularly to the first path 22. A pair of reinforcing film pieces 9,9 is severed by the cutter 55 from the respective continuous strips 52,53 each time when the latter have been fed by each predetermined distance. The double gripper 54 is moved in the direction of the arrow G in FIG. 4 to its advanced position, whereupon the actuator cam 62 is pushed by the piston 66 to enter between the rear ends 64,65 of the upper and lower grip members 60,61, causing both the upper grip members 58,60 and the lower grip members 59,61 to grip the respective leading ends of the two severed reinforcing film pieces 9,9. The gripper 56 is then returned in the direction of the arrow H to its original or retracted position (FIG. 4), bringing the two reinforcing film pieces 9', 9' in register with the aperture W (FIG. 3), i.e. the first working station.

Figure 2A:
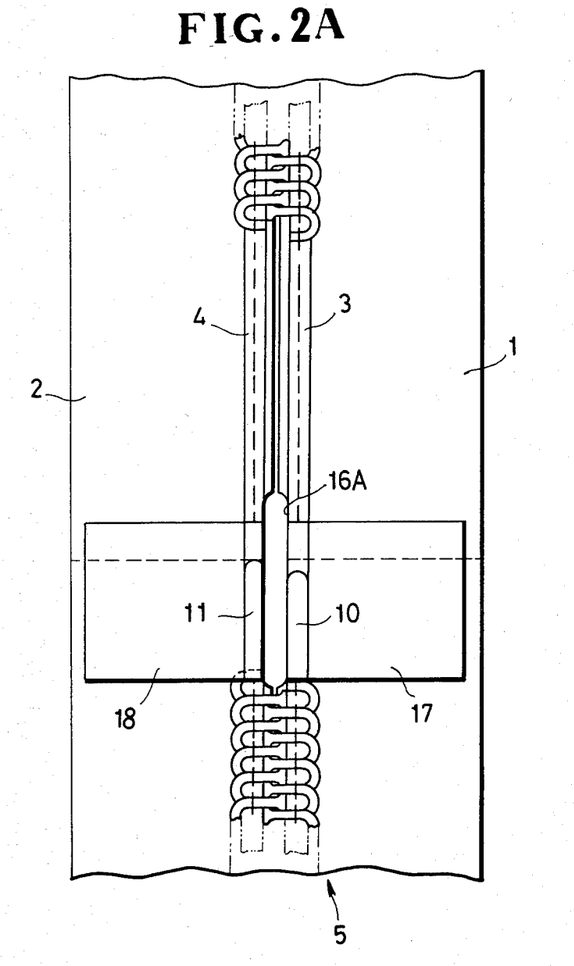
FIG. 2A is a view similar to FIG. 2, showing a modified form of the processed element-free portion.

Substantialy concurrently with the retration of the gripper 56, the ultrasonic horn 48 and the shaping die 50 are moved upwardly and downwardly, respectively, i.e. toward one another, to press the two reinforcing film pieces 9', 9' against the opposed blank tape portions 8 of an adjacent pair at the first working station while the fastener chain 5 is held in place by the pressure pads 46, 47 (FIG. 3). Thus pressure and ultrasonically-generated heat are applied to the blank tape portions 8 of an adjacent pair and the reinforcing film pieces 9, 9, placed one on each surface of the fastener chain 5 by the gripper 54, to fuse the reinforcing film pieces 9, 9 to the inner marginal tape portions (FIG. 5) and, at the same time, to shape such fused marginal portions so as to provide along the core cords 3, 4 a pair of pin-like members 10, 11 (FIGS. 2 and 5) to which a pin and a box of a separable bottom end stop (not shown) are to be attached respectively for production of a separable slide fastener. An opening 16 is also provided, which has a narrow elongate portion defined by the inner surfaces 12, 13 of the pin-like members 10, 11, and an enlarged portion contiguous to the narrow portion at 14, 15, each reinforcing film piece 9 being thus divided into two halves 17, 18 (FIGS. 2, 4 and 5) by the opening 16. Alternatively, either the pin-like members 10, 11 or the opening 16A may have a modified shape (FIG. 2A) that is provided by the use of a modified shaping die (not shown).

Then, the piston 66 is moved from its advanced position (solid lines in FIG. 4) to its retracted position (phantom lines in FIG. 4), allowing the actuator cam 62 to be retracted out of the space between the rear ends 64, 65 of the grip members 60, 61 under the biasing force of the springs 69, 70. This retraction of the actuator cam 62 causes the gripper 56 to open, releasing the two reinforcing film pieces 9', 9'. Substantially concurrently with the retraction of the actuator cam 62, the ultrasonic horn 48 and the pressure pads 46, 47 are moved upwardly, and the shaping die 50 is moved downwardly.

Subsequently, the fastener chain 5 is further moved along the first path 22 by the feed rollers 20, 21. When the blank tape portions 8 of an adjacent pair, with the two pairs of reinforcing film piece halves 17, 18; 17, 18 partially fused thereto, come to the tip end 75 of the feeler lever 74, the latter is pivotally moved in the direction of the arrows J to actuate the switch LS2 for initiating the operation of the heating die 77 and punch 78, as described below.

In response to actuation of the switch LS2, the heating die 78 and punch 77 are moved upwardly and downwardly, respectively, i.e. toward one another at the second working station to press the two pairs of film piece halves 17, 18; 17, 18 against the blank tape portions 8 of an adjacent pair at their superposed areas except at the inner tape edges and at the two pin-like members 10, 11. As a result, the two reinforcing film pieces 9, 9 are fused at their whole area to the blank tape portions 8 of an adjacent pair. The attachment of the reinforcing film pieces 9, 9 to the fastener chain 5 has thus been completed; the resultant fastener chain 5 has the two pin-like members 10, 11 to which a pin and a box of the separable bottom end stop (not shown) are to be attached respectively for production of a separable slide fastener.

According to the present invention, the pin-like members 10, 11 and the opening 16 are formed by the shaping die 50 and the ultrasonic horn 48 at the first working station, and thereafter the partially fused reinforcing film pieces 9 and the blank tape portions 8 of an adjacent pair are fused at their superposed areas except at the pin-like members 10, 11 by the heating die 78 and punch 77 at the second working station. With this arrangement, it is possible to control the operating time and temperature of the shaping die 50 and ultrasonic horn 48 independently from those of the heating die 78 and punch 77, and vice versa, thus enabling accurate and easy application of reinforcing film pieces to a slide fastener chain for production of separable slide fasteners. For the same reason, it is possible to construct the shaping die 50 and the ultrasonic horn 48 in precise agreement with their desired operating conditions, irrespective of the heating die 78 and punch 77, and vice versa.

Further, since the second working station is disposed remotely from the first working station, the partially fused reinforcing film pieces and the blank tape portions (at the second working station) can be fused in desired condition without being excessively heated or otherwise affected by the heat generated by the ultrasonic horn at the first working station. Accordingly, an improved quality of slide fastener chain, suitable for production of separable slide fasteners, can be obtained.

Although various minor modifications may be suggested by those versed in the art, it should be understood that we wish to embody within the scope of the patent warranted hereon, all such embodiments as reasonably and properly come within the scope of our contribution to the art.

What is claimed is:

1. A method of applying reinforcing film pieces of thermoplastic synthetic resin to a slide fastener chain having a pair of continuous thermoplastic stringers with interengaged coupling elements mounted on thermoplastic core threads thereof for production of slide fasteners having a separable bottom end stop, the fastener chain having successive spaced between the successive spaced pairs of coupling element groups, said method comprising the steps of:

(a) moving the fastener chain longitudinally along a first path;
   (b) automatically temporarily stopping the movement of the fastener chain every time each of the successive spaced pairs of blank tape portions arrives at a first working station;
   (c) feeding a continuous strip of the thermoplastic synthetic resin longitudinally, in uniform steps equal to the length of one reinforcing film piece, to the first working station along a second path extending perpendicularly to the first path;
   (d) automatically severing a reinforcing film piece from the continuous strip each time when the latter has been fed said length;
   (e) automatically placing the severed a reinforcing film piece on the fastener chain across one of the successive spaced pairs of blank tape portions at the first working station;
   (f) applying pressure and ultrasonically-generated heat only to the inner marginal edges of said one pair of blank tape portions and to the abutting portion of the reinforcing film piece thereon to partially fuse the reinforcing film piece to said one pair of blank tape portions and to shape the fused marginal portions along the core cords as a pair of pin-like members subsequently receptive of a pin and a box of the separable bottom end stop;
   (g) restarting the movement of the chain and piece of film in the first path and again automatically temporarily stopping the movement at a second working station; and
   (h) applying reduced pressure and heat to said one pair of blank tape portions and said reinforcing film piece thereon at their superposed non-fused areas to fuse the same.

2. A method according to claim 1, including the further step of sensing the approach of said one pair of blank tape portions to said first working station, said automatic fastener-chain stopping being performed in response to said sensing.

3. A method according to claim 1, including the further step of sensing the arrival of said partially fused pair of blank tape portions and the reinforcing film piece at said second working station, said step of applying reduced pressure and heat being performed in response to said sensing.

4. An apparatus for applying reinforcing film pieces of thermoplastic synthetic resin to a slide fastener chain having a pair of continuous stringers with interengaged coupling elements mounted on thermoplastic core threads thereof for production of slide fasteners having a separable bottom end stop, the fastener chain having successive spaced pairs of opposed blank tape portions between the successive spaced pairs of coupling element groups, said apparatus comprising:

(a) a frame having a chain guide for supporting and guiding the fastener chain;
   (b) means for moving the fastener chain longitudinally in steps along a first path over said chain guide;
   (c) a first working station disposed in said path;

(d) a first sensor disposed in said first path upstream of the first working station for detecting the approach of one of the successive spaced pairs of blank tape portions toward said first working station;

(e) a fastener-chain stop supported by said frame and operatively connected with said first sensor for temporarily stopping the movement of the fastener chain with said one pair of blank tape portions disposed at said first working station;

(f) means for feeding a continuous strip of the thermoplastic synthetic resin longitudinally, in uniform steps equal to the length of one reinforcing film piece, to said first working station along a second path extending perpendicularly to said first path;

(g) a cutter disposed in said second path upstream of said first working station and operable in timed relation to the stepwise feeding operation of said feeding means for severing a reinforcing film piece from the continuous strip each time when the strip has been fed by said length;

(h) a gripper movable back and forth along said second path across said first working station for gripping a leading end of the severed reinforcing film piece and for placing the same on the fastener chain across said one pair of blank tape portions at said first working station;

(i) a shaping die and a coacting ultrasonic horn vertically aligned with one another at said first working station and movable toward and away from one another in timed relation to the movement of said gripper for applying pressure and ultrasonically-generated heat only to the inner marginal edges of said one pair of blank tape portions and to the abutting portion of said reinforcing film piece thereon to partially fuse the latter to said one pair of blank tape portions and to shape said fused marginal portions along the core cords as a pair of pinlike members subsequently receptive of a pin and a box of the separable bottom end stop; and (j) a heating die and a coacting heating punch vertically aligned with one another at a second working station spaced downstream from said first working station along said first path, said heating die and punch being movable toward one another for applying reduced pressure and heat to the superposed non-fused areas of said one pair of blank tape portions and said reinforcing film piece thereon to fuse the same.

5. An apparatus according to claim 4, further including a second sensor disposed in said first path immediately upstream of the second working station for detecting the arrival of said one pair of blank tape portions, said second sensor being operatively connected to said heating die and punch for initiating the operation of said heating die and punch in response to said detecting.

* * * * *